(12) United States Patent
Dames et al.

(10) Patent No.: US 7,254,542 B2
(45) Date of Patent: Aug. 7, 2007

(54) PORTAL DATA PASSING THROUGH NON-PERSISTENT BROWSER COOKIES

(75) Inventors: Dwayne Dames, Boynton Beach, FL (US); David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 10/404,983

(22) Filed: Mar. 31, 2003

(65) Prior Publication Data

US 2004/0193424 A1 Sep. 30, 2004

(51) Int. Cl.
*G10L 15/00* (2006.01)

(52) U.S. Cl. .................................. 704/270.1

(58) Field of Classification Search ...................... None
See application file for complete search history.

(56) References Cited

U.S. PATENT DOCUMENTS

| | | | |
|---|---|---|---|
| 5,961,593 A | 10/1999 | Gabber et al. | |
| 6,112,240 A | 8/2000 | Pogue et al. | |
| 6,237,060 B1 | 5/2001 | Shilts et al. | |
| 6,266,690 B1 | 7/2001 | Shankarappa et al. | |
| 6,327,609 B1 | 12/2001 | Ludewig et al. | |
| 6,490,564 B1 * | 12/2002 | Dodrill et al. | 704/275 |
| 6,741,853 B1 * | 5/2004 | Jiang et al. | 455/418 |
| 6,766,298 B1 * | 7/2004 | Dodrill et al. | 704/270.1 |
| 6,779,025 B1 * | 8/2004 | Wolfe et al. | 709/219 |
| 6,785,653 B1 * | 8/2004 | White et al. | 704/270.1 |
| 2001/0021917 A1 | 9/2001 | Hatano | |
| 2001/0051978 A1 | 12/2001 | Allen et al. | |
| 2002/0007393 A1 | 1/2002 | Hamel | |
| 2002/0032731 A1 | 3/2002 | Qian et al. | |
| 2002/0057678 A1 | 5/2002 | Jiang et al. | |
| 2002/0078192 A1 | 6/2002 | Kopsell et al. | |
| 2002/0099936 A1 | 7/2002 | Kou et al. | |
| 2002/0104025 A1 | 8/2002 | Wrench, Jr. | |
| 2002/0120864 A1 | 8/2002 | Wu et al. | |
| 2002/0128845 A1 | 9/2002 | Thomas et al. | |
| 2002/0147772 A1 | 10/2002 | Glommen et al. | |
| 2002/0147818 A1 | 10/2002 | Wengrovitz | |
| 2002/0152378 A1 | 10/2002 | Wallace, Jr. et al. | |
| 2002/0156781 A1 | 10/2002 | Cordray et al. | |
| 2003/0051036 A1 | 3/2003 | Wang et al. | |

OTHER PUBLICATIONS

U.S. Appl. No. 10/317,465, filed Dec. 12, 2002, Dow, et al.
"Rent-an-identity", Research Disclosure, IBM Corp., Art. 440195, p. 2242, Dec. 2000.
"Selective Routing of Servlet Content to Transcoding Module", Research Disclosure, IBM Corp., Art. 422124, May 1999.

* cited by examiner

*Primary Examiner*—David D. Knepper
(74) *Attorney, Agent, or Firm*—Akerman Senterfitt

(57) ABSTRACT

A method of maintaining state information within a voice browser can include establishing a voice browser session with a client. The voice browser can be in communication with an application, wherein the voice browser and the application are remotely located from the client. State information, which corresponds to the voice browser session and application, can be received from the application. The state information can be stored as non-persistent data within the voice browser. The non-persistent data can be provided to the application to continue a transaction managed by the application.

18 Claims, 3 Drawing Sheets

PORTAL DATA PASSING THROUGH NON-PERSISTENT BROWSER COOKIES

BACKGROUND

1. Field of the Invention

This invention relates to the field of voice browsers and, more particularly, to the interaction of voice browsers with applications and/or portlets.

2. Description of the Related Art

Web-based applications often must maintain state information in order to function properly or complete online transactions. One common example of this situation is where a user visits an online retail Web site and initiates a transaction. Prior to completing the transaction, the user can visit one or more other Web sites and then return to the online retail Web site. When the user returns to the online retail Web site, the revisited application can be restored to the same operating state as when the user temporarily exited the transaction and application to visit other Web sites. The user then can complete the transaction.

To function in this manner, the application executing within the online retail Web site must maintain state information specifying the details of the transaction. These details can include particular items being purchased, a user or client identifier, a location within a logical structure governing the transaction processing, the last interaction or selection of the user, for example the particular Web page that was displayed to the user and any information presented upon that Web page, as well as the time and/or date of the transaction.

One way in which state information can be maintained is to store the information as a persistent file, called a cookie, within the client machine. The traditional concept of storing cookies on a client computer system, that is the user-specific computing device which includes a browser, does provide a mechanism for storing state information for use by various applications. The cookie paradigm, however, does not address cases in which the user accesses an application through a non-user specific computing device which cannot store persistent cookies or has no persistent storage.

Another approach to maintaining state information is to store the information within a session identifier on the application server. As demand for bandwidth increases, server farms or server clusters have emerged as one way in which content can be provided to an ever increasing population of users. Server farms or clusters provide a mechanism through which an application can be replicated across each of the servers so that increased bandwidth can be achieved through server and application redundancy.

The storage of persistent state information within a particular server is problematic in cases where multiple servers are used to host the same application. In such cases, there is a high probability that a user, when revisiting an application during a subsequent portal session, returns to a different instance of the application executing on a different server than was accessed during the prior portal session. In this case, the state information is not accessible and is of no use.

The aforementioned problems relating to the maintenance of state information with respect to portals are further complicated when considering voice portals. A voice portal typically includes one or more voice servers, each including one or more voice browser instances. If a user is to be able to navigate the voice portal from one application to the next, state information for the applications must be maintained else previous states of the applications cannot be restored when the user revisits those applications, especially in mid-transaction.

Further complicating matters, voice browsers typically are distributed across computing networks, in contrast to conventional visual browsers, which are disposed in a personal computing device and are accessed by a single and same user. As such, conventional voice browsers are accessed by many users. Conventional voice portals which rely upon voice browser technology are designed to connect a user with an available voice browser which can be returned to a pool of available voice browsers after completion of the voice browser session, or to instantiate a new instance of a voice browser for each session. Thus, when the user accesses a conventional voice portal, the user is connected to a single instance of a voice browser. Accordingly, there is a high probability that a user will be connected to a different instance of the voice browser and/or different voice server for each call or voice portal and/or browser session. Because voice systems are designed in this manner, conventional voice browsers do not include persistent storage.

SUMMARY OF THE INVENTION

The invention disclosed herein provides a method, system, and apparatus for maintaining application state information in voice browsers. According to the present invention, application state information can be stored within a voice browser as a non-persistent data construct. State information for one or more applications which pertains to a particular voice browser session can be stored and accessed for the duration of that session.

The maintenance of state information allows applications to determine whether state information exists when accessing the voice browser. When a user revisits the application, the state of the application as specified by the stored application state information can be restored. By utilizing a non-persistent data construct which can be stored within each particular instance of a voice browser, the present invention overcomes deficiencies inherent in maintaining application state information across multiple browsers, sessions, and servers using persistent storage.

One aspect of the present invention can include a method of maintaining state information within a voice browser. The method can include establishing a voice browser session with a client, wherein the voice browser is in communication with an application, and the voice browser and the application are remotely located from the client. State information corresponding to the voice browser session and the application can be received from the application. The state information, which also specifies the application to which the state information is associated, can be stored as non-persistent data within the voice browser and can be provided to the application to continue a transaction managed by the application.

The non-persistent data can be maintained for the duration of the voice browser session. For example, the method can include terminating the voice browser session and discarding the non-persistent data associated with the terminated voice browser session. According to one embodiment of the present invention, the voice browser can be an instance of the voice browser. In that case the method can include destroying the instance of the voice browser.

The present invention also can include receiving a query from the application for the existence of non-persistent data within the voice browser which corresponds to the voice browser session and the application, and determining whether such non-persistent data exists. If the non-persistent data exists, the method can include identifying the non-persistent data to provide the identified non-persistent data to the application in the aforementioned providing step.

Another embodiment of the present invention can include a method of maintaining state information within a voice browser during an established voice browser session. The method can include accessing an application responsive to a client request during the voice browser session. A query can be received from the application for the existence of non-persistent data within the voice browser which corresponds to the voice browser session and the application, wherein the non-persistent data specifies state information for the application. A determination can be made as to whether such non-persistent data exists. The application can be notified of the determination.

Another aspect of the present invention can include a voice browser configured to store application state information. The voice browser can include means for establishing a voice browser session with a client, wherein the voice browser is in communication with an application, and the voice browser and the application are remotely located from the client. The voice browser further can include means for receiving state information from the application, wherein the state information corresponds to the voice browser session and the application, and means for storing the state information as non-persistent data within the voice browser. Means for providing the non-persistent data to the application to continue a transaction managed by the application also can be included.

Another embodiment of the present invention can include a voice browser configured to store application state information which includes means for accessing an application during a voice browser session responsive to a client request. The voice browser also can include means for receiving a query from the application for the existence of non-persistent data within the voice browser which corresponds to the voice browser session and the application, wherein the non-persistent data specifies state information for the application. Additionally, the voice browser can include means for determining whether such non-persistent data exists and means for notifying the application as to whether the non-persistent data exists.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method, system, and apparatus for maintaining application state information in voice browsers. According to the present invention, application state information can be stored within a voice browser as a non-persistent data construct. State information for one or more applications which pertains to a particular user or client voice browser session can be stored and accessed for the duration of that session. Accordingly, applications can query the voice browser to determine whether state information exists. When a user revisits the application, the state of the application as determined from the stored application state information can be restored.

Figure 1:
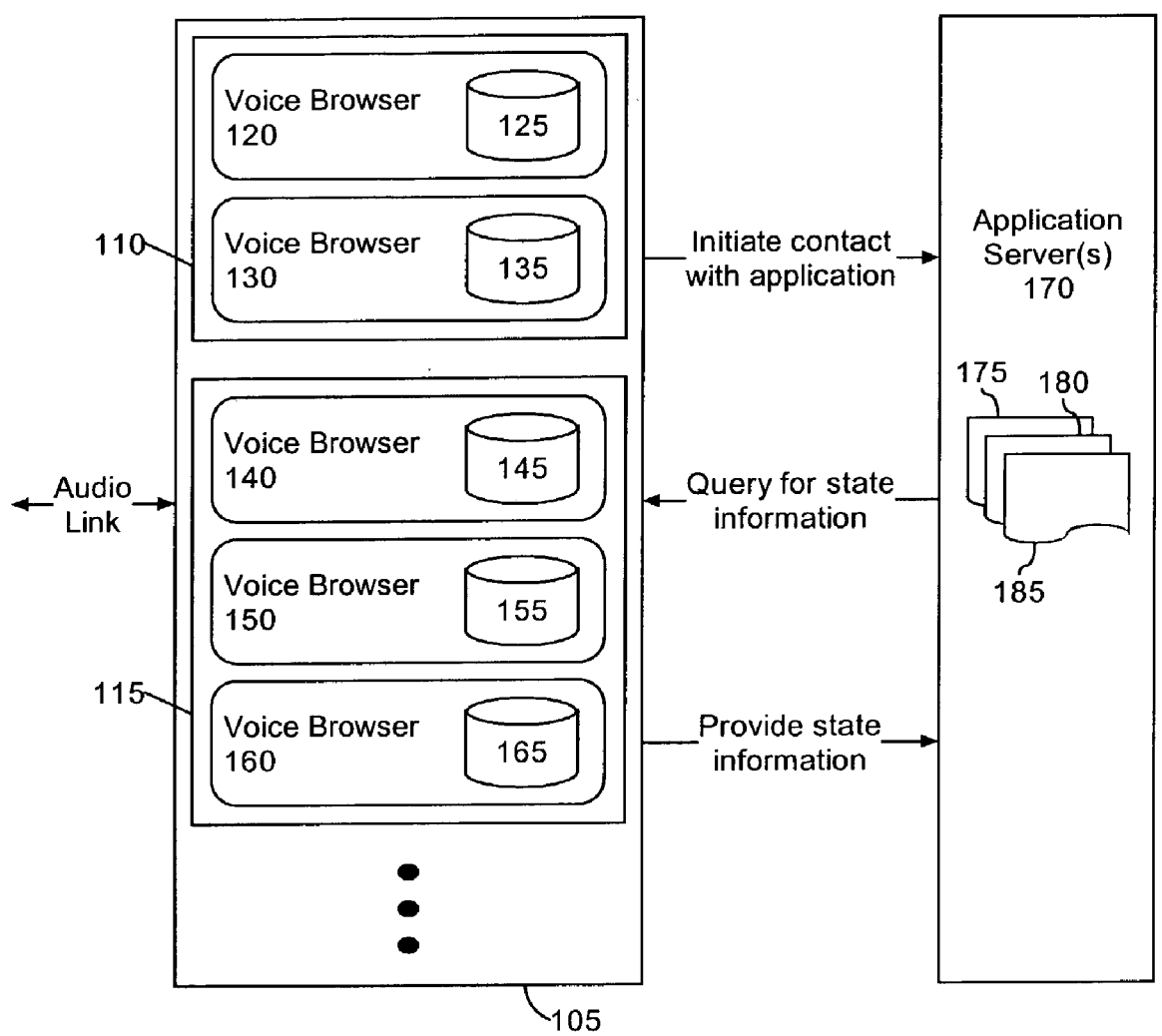
FIG. 1 is a schematic diagram illustrating an exemplary voice portal which is configured in accordance with the inventive arrangements disclosed herein.

FIG. 1 is a schematic diagram illustrating an exemplary voice portal 100 which is configured in accordance with the inventive arrangements disclosed herein. As shown, the voice portal 100 can include a voice server cluster 105, having one or more voice servers such as voice server 110 and voice server 115, as well as one or more application servers 170. The voice servers 110 and 115 can be communicatively linked with the application server 170 through suitable packet-switched communication links.

The voice servers 110 and 115 can include one or more voice browser instances as shown. The term "voice browser", as used herein, refers to an application which can interpret or execute any of a variety of markup languages or speech-enabled applications to receive voice inputs and provide voice outputs. The voice server 110 can include voice browsers 120 and 130, with each voice browser having a non-persistent data store 125 and 130 respectively. The non-persistent data store can include, but is not limited to, a random access memory or other suitable memory which can be cleared or erased when a voice browser session ends or the voice browser instance is terminated. Similarly, the voice server 115 can include one or more voice browser instances 140, 150, and 160, with each voice browser instance having a non-persistent data store 145, 155, and 165 respectively.

The non-persistent data store of a voice browser instance can be used to store state information from one or more applications which are in communication with that voice browser instance. The application state information can include user and/or client identifiers, an application reference or identifier, a time and/or date stamp, a session identifier, the last Web page presented to a client, as well as particular information including user inputs which can be used to specify an particular operational state of the application. Storage of this information allows a user to navigate to one or more other applications during the course of a voice browser session, and navigate back to or revisit any of those applications to continue as if the user had not departed from the application.

The application server 170 can host one or more application programs such as application programs 175, 180, and 185, which can interact with the voice browser instances of the voice server cluster 105. According to one embodiment of the present invention, the application programs can be implemented as voice markup language scripts such as Voice Extensible Markup Language (VoiceXML) scripts. The application programs, however, can be implemented as any of a variety of different voice-enabled programs and/or markup language documents which can be interpreted or executed by one of the voice browser instances 120, 130, 140, 150, and/or 160. For example, an application can be retrieved from the application server, loaded within a voice browser instance, and executed. Common examples of such applications can include, but are not limited to, voice-enabled retail shopping applications, banking applications, travel reservation applications, and the like.

It should be appreciated that the voice portal 100 disclosed herein is provided for purposes of illustration. As such, the voice portal 100 can include any number of voice servers and/or voice browsers as may be necessary depending upon the capabilities of the particular hardware and/or software platform used. In any case, the particular number of voice servers, voice browsers, or application servers shown in FIG. 1 is not intended as a limitation of the present invention.

In operation, a user can initiate a communications session with the voice portal 100. For example, the user can access the voice portal 100 via a computer system, a computing device, or a telephony device communicating through a packet-switched network. Alternatively, the user can access the voice portal via a circuit-switched telephony link which interfaces with a gateway for converting the circuit-switched telephony signals to packet-switched data to be provided to the voice portal 100.

Once the user accesses the voice portal 100, the user can be associated with a voice browser, for example voice browser 120, for the duration of the user's session. Applications which are requested by the user through the voice portal 100 can be rendered through the voice browser 120 so that the user can receive an audible rendition of the requested material, prompts, and/or content from the application. For example, the user can request access to application 175 within the application server 170. Thus, as shown, the voice browser 120 can initiate contact with a user specified application, in this case application 175.

FIG. 1 symbolically illustrates the interaction between the application 175 and the voice browser 120. It should be appreciated, however, that the application 175 can be provided to the requesting voice browser 120. Accordingly, the application 175 can be loaded and interpreted and/or executed by the voice browser 120.

During execution, the application 175 can query the voice browser 120 to determine whether state information has been stored within the non-persistent data store 125. As state information is to be cleared after each session, the existence of state information within the non-persistent data store 125 can be assumed to be for the current session. The voice browser 120 can determine whether the existing state information corresponds to application 175. If such state information does exist within the non-persistent data store 125, the voice browser 120 can provide that state information to application 175.

Figure 2:
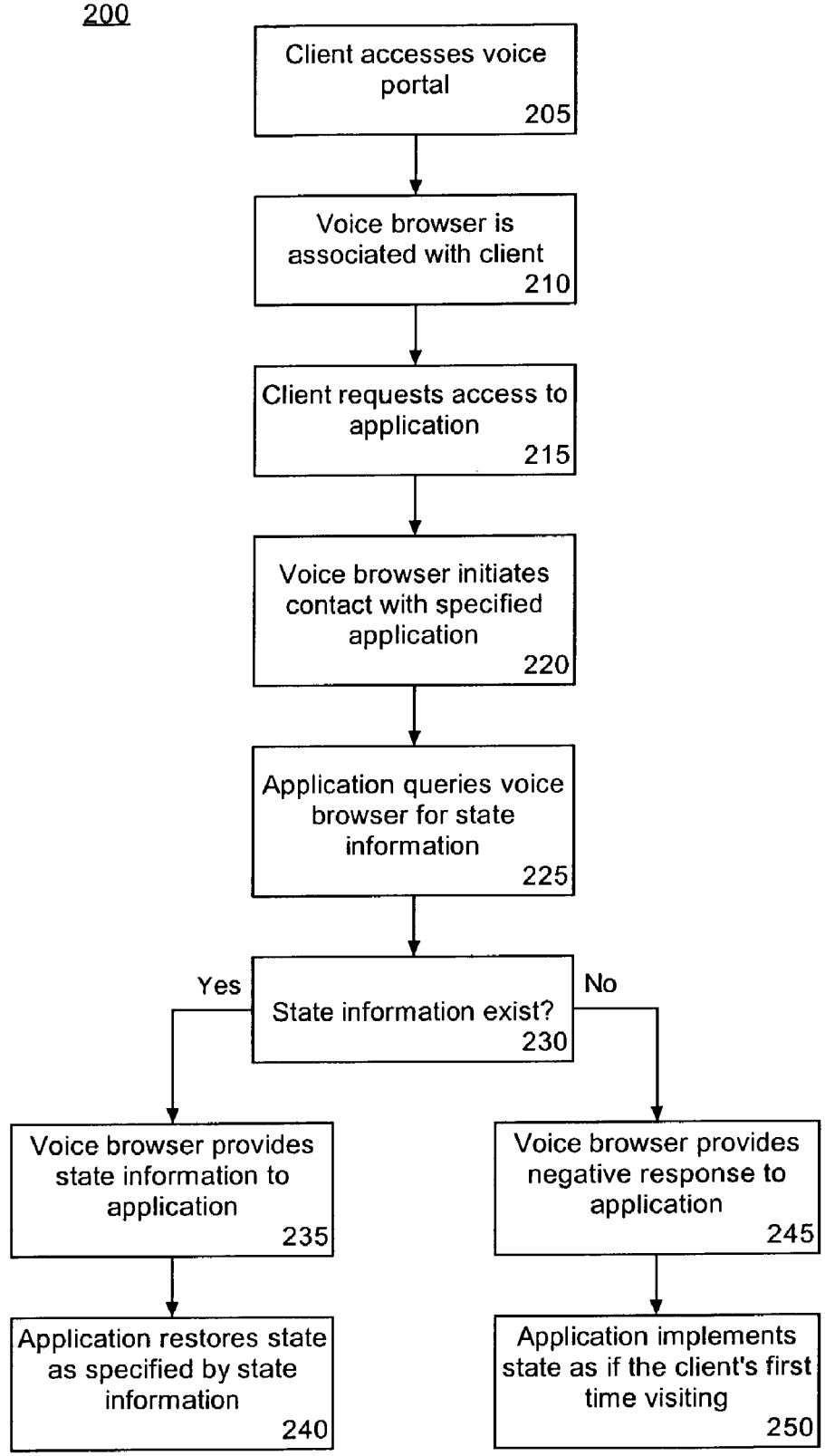
FIG. 2 is a flow chart illustrating a method of using application state information within a voice browser in accordance with the inventive arrangements disclosed herein.

FIG. 2 is a flow chart illustrating a method 200 of using application state information within a voice browser instance in accordance with the inventive arrangements disclosed herein. The method 200 can begin in step 205 where a user, acting through a client application executing within a client computing device, accesses a voice portal. As noted, the client can contact the voice portal via a packet-switched network or through a combination of circuit-switched and packet-switched networks.

In step 210, the voice portal can associate a voice browser instance with the client. According to one embodiment of the present invention, an instance selected from a pool of available voice browser instances can be associated with the client. According to another embodiment, a voice browser instance can be newly instantiated and then associated with the client. In step 215, the client can request access to a particular application or portlet. The voice browser instance, having received the client request, can initiate contact with the client specified application in step 220. That is, the voice browser instance can issue a request to the application server indicating the particular application requested by the client.

In step 225, the application, executing within the application server, can query the voice browser instance. For example, the application, once retrieved and loaded into the voice browser instance, then can query the voice browser instance. More particularly, the application can query the voice browser instance to determine whether the voice browser instance has state information stored therein in the non-persistent data store which pertains to the application. The state information can be cleared at the close of each voice browser session or at the start of a voice browser session. Accordingly, any state information stored within the non-persistent data store of the voice browser instance which corresponds to the requesting application also corresponds to the current session and client. Further, as noted, such state information specifies the last operating state of the application.

In step 230, the voice browser instance can determine whether any such information exists. That is, the non-persistent data store of the voice browser instance can be searched for state information corresponding to the requesting application. If such state information does exist and is identified, the method can proceed to step 235. In step 235, the voice browser instance can send the identified state information to the requesting application. Accordingly, the application can receive the state information, read and parse the state information, and then restore the particular state of the application as specified by the received state information.

If no state information exists or is identified for the requesting application, the method can proceed to step 245. In step 245, the voice browser instance can provide a negative response to the requesting application indicating that no state information exists which corresponds to the application. Accordingly, in step 250, the application can enter a state, such as a default state, as if the client were visiting the application or portlet for the first time.

Figure 3:
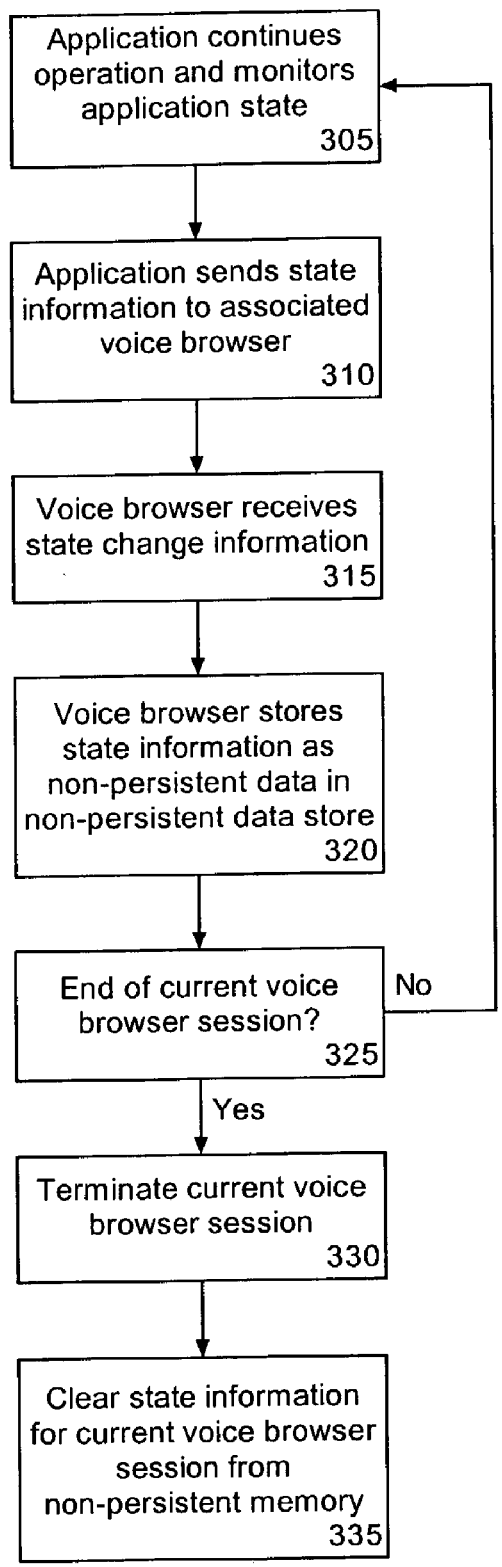
FIG. 3 is a flow chart illustrating a method of storing and/or updating application state information within a voice browser in accordance with the inventive arrangements disclosed herein.

FIG. 3 is a flow chart illustrating a method 300 of storing and/or updating application state information within a voice browser instance in accordance with the inventive arrangements disclosed herein. The method 300 can begin in a state where a voice browser session has been established between a client and a voice browser instance. The voice browser instance further can be in communication with a client specified application. Accordingly, in step 305, the application can continue to operate and monitor for state changes. The state changes can correspond to predetermined locations or events encountered or detected within the application logic which, when encountered or executed, cause the application to store application state information.

In step 310, for example, when such a state change occurs, the application can send state information to the voice browser instance which is in contact with the application. In step 315, the voice browser instance can receive the state information. In step 320, the voice browser instance can store the state information within its non-persistent data store.

The particular manner or formatting of the stored state information can be selected from any of a variety of different data constructs such as an array, linked list, vector, or the like. Further, the voice browser can include intelligence to overwrite state information from a particular application with newly received state information from the same application. Alternatively, the voice browser can append state information received from an application to previously stored state information from the same application such that a history of state information is maintained. In that case, a complete set of state information can be stored when received. Alternatively, only the particular information within the state information that has changed since the last state information update from the same application need be stored.

Additionally, although the state information can specify any of a variety of information as previously noted, such as client and/or user identifiers, dates, times, and the like, the state information need not include all such information. As mentioned, state information can be stored on a per voice browser instance basis within a non-persistent data store of the voice browser instance. The non-persistent data store can be cleared after each voice session or when a new voice session begins. Thus, the stored data need only specify the information needed to restore an operating state of an application and an identifier which indicates the particular application to which the state information corresponds. In any case, the inventive arrangements are not limited by the particular manner in which the state information is stored within non-persistent memory or the particular data items included within the state information.

Continuing with step 325, a determination can be made as to whether the current voice browser session is to be ended. For instance, the voice browser session can time out or receive an event specifying that the session has been terminated. Such an event, for example, can be received from the client through the voice portal or from the application which is in contact with the voice browser. If the current voice browser session is to continue, the method can proceed to step 305 and repeat as necessary.

If, however, the current voice browser session is to be terminated or ended, the method can proceed to step 330 where the voice browser session is terminated. In step 335, the non-persistent data is cleared. Thus, each time a voice browser instance is associated with a client for a new voice browser session, the voice browser instance begins the session with no application state information stored within the non-persistent data store of the voice browser instance. It should be appreciated that according to one embodiment of the present invention, for example in the case where calling clients are associated with newly instantiated voice browsers, not only the state information, but the entire voice browser instance may be destroyed. According to another embodiment of the present invention, the voice browser instance can be returned to a pools of available voice browser instances for future use.

The present invention addresses the deficiencies of conventional state information maintenance techniques. According to the inventive arrangements disclosed herein, application state information can be stored as non-persistent data within a voice browser instance. As such, the state information is not saved across voice browser instances or servers. The storage of state information for one or more applications within the non-persistent memory of the voice browser instance allows an application to request corresponding state information when that application is accessed. Thus, the application can query the voice browser instance to determine the existence of any relevant state information.

Another aspect of the present invention is that the applications or portlets need not be altered to access the non-persistent state information maintained within the voice browser instances. The voice browser instances can be configured to include the logic necessary to maintain the application state information within memory and set and access that information responsive to application requests. As a result, the applications need not be aware that the voice browser instances do not store persistent data.

The present invention also can be utilized as a technique for passing information between one or more related or associated applications or portlets. For example, one or more applications can be configured to store state information in similar fashion or can be configured to retrieve and/or interpret one another's state information from a voice browser or voice browser instance. Accordingly, each associated application can derive state information from the user or client's interaction with a related one of the applications rather than only from previous interactions with that particular application.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of maintaining state information within a voice browser comprising:
   establishing a voice browser session with a client, wherein the voice browser is in communication with an application, and the voice browser and the application are remotely located from the client;
   receiving state information from the application, wherein the state information corresponds to the voice browser session and the application;
   storing the state information as non-persistent data within the voice browser; and
   providing the non-persistent data to the application to continue a transaction managed by the application.

2. The method of claim 1, wherein the non-persistent data is maintained for the duration of the voice browser session.

3. The method of claim 1, further comprising:
   terminating the voice browser session; and
   discarding the non-persistent data associated with the terminated voice browser session.

4. The method of claim 3, wherein the voice browser is an instance of the voice browser, said method further comprising:
   destroying the instance of the voice browser.

5. The method of claim 1, wherein the state information specifies the application to which the state information is associated.

6. The method of claim 1, further comprising:
receiving a query from the application for the existence of non-persistent data within the voice browser which corresponds to the voice browser session and the application; and
determining whether such non-persistent data exists.

7. The method of claim 6, further comprising:
if the non-persistent data exists, identifying the non-persistent data to provide the identified non-persistent data to the application in said providing step.

8. A method of maintaining state information within a voice browser during an established voice browser session, said method comprising:
during the voice browser session, accessing an application responsive to a client request;
receiving a query from the application for the existence of non-persistent data within the voice browser which corresponds to the voice browser session and the application, wherein the non-persistent data specifies state information for the application;
determining whether such non-persistent data exists; and
notifying the application as to whether the non-persistent data exists.

9. A machine readable storage, having stored thereon a computer program having a plurality of code sections executable by a machine for causing the machine to perform the steps of:
establishing a voice browser session with a client, wherein the voice browser is in communication with an application, and the voice browser and the application are remotely located from the client;
receiving state information from the application, wherein the state information corresponds to the voice browser session and the application;
storing the state information as non-persistent data within the voice browser; and
providing the non-persistent data to the application to continue a transaction managed by the application.

10. The machine readable storage of claim 9, wherein the non-persistent data is maintained for the duration of the voice browser session.

11. The machine readable storage of claim 9, further comprising:
terminating the voice browser session; and
discarding the non-persistent data associated with the terminated voice browser session.

12. The machine readable storage of claim 11, wherein the voice browser is an instance of the voice browser, said machine readable storage further causing the machine to perform the step of:
destroying the instance of the voice browser.

13. The machine readable storage of claim 9, wherein the state information specifies the application to which the state information is associated.

14. The machine readable storage of claim 9, further comprising:
receiving a query from the application for the existence of non-persistent data within the voice browser which corresponds to the voice browser session and the application; and
determining whether such non-persistent data exists.

15. The machine readable storage of claim 11, further comprising:
if the non-persistent data exists, identifying the non-persistent data to provide the identified non-persistent data to the application in said providing step.

16. A machine readable storage, having stored thereon a computer program having a plurality of code sections executable by a machine for causing the machine to perform the steps of:
during a voice browser session, accessing an application responsive to a client request;
receiving a query from the application for the existence of non-persistent data within the voice browser which corresponds to the voice browser session and the application, wherein the non-persistent data specifies state information for the application;
determining whether such non-persistent data exists; and
notifying the application as to whether the non-persistent data exists.

17. A voice browser configured to store application state information comprising:
means for establishing a voice browser session with a client, wherein the voice browser is in communication with an application, and the voice browser and the application are remotely located from the client;
means for receiving state information from the application, wherein the state information corresponds to the voice browser session and the client;
means for storing the state information as non-persistent data within the voice browser; and
providing the non-persistent data to the application to continue a transaction managed by the application.

18. A voice browser configured to store application state information comprising:
means for accessing an application during a voice browser session responsive to a client request;
means for receiving a query from the application for the existence of non-persistent data within the voice browser which corresponds to the voice browser session and the application, wherein the non-persistent data specifies state information for the application;
means for determining whether such non-persistent data exists; and
means for notifying the application as to whether the non-persistent data exists.

* * * * *